Figure 1:
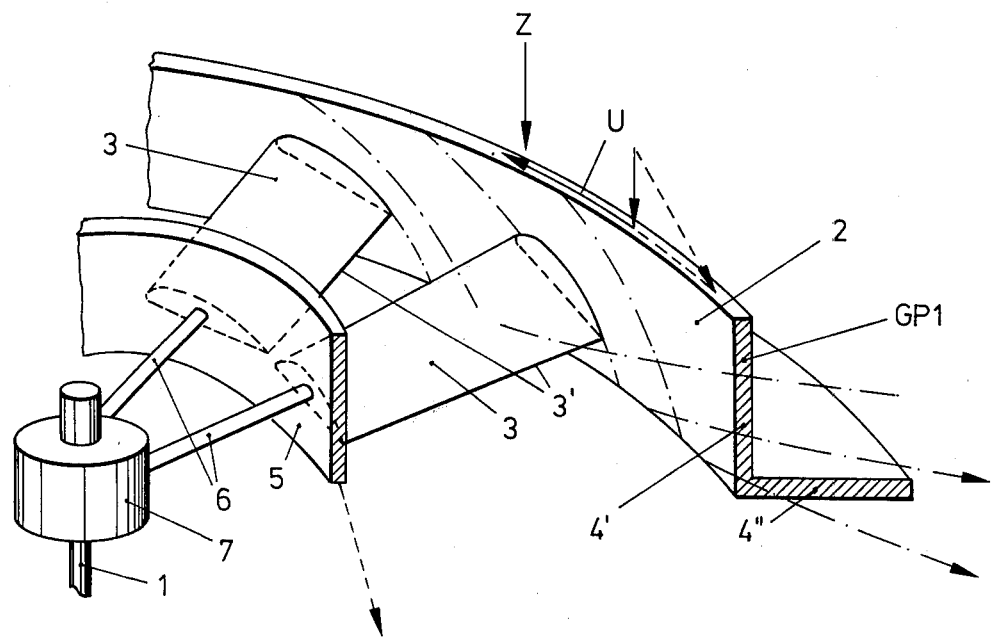

United States Patent [19]

Kling

[11] 4,289,450

[45] Sep. 15, 1981

[54] ROTOR FOR OPERATION IN A FLOW MEDIUM

[76] Inventor: Alberto Kling, Seestrasse 38, D-8131 Berg, Fed. Rep. of Germany

[21] Appl. No.: 87,524

[22] Filed: Oct. 23, 1979

[30] Foreign Application Priority Data

Dec. 5, 1978 [DE] Fed. Rep. of Germany ....... 2852554

[51] Int. Cl.³ ............................................ F03D 1/06
[52] U.S. Cl. ................................... 416/192; 416/189; 416/193 R
[58] Field of Search ............... 416/189 R, 189 A, 192, 416/196 A, 193 R

[56] References Cited

U.S. PATENT DOCUMENTS 3,222,533 12/1965 MacKay ..................... 416/189 A X

FOREIGN PATENT DOCUMENTS

| | | | |
|---|---|---|---|
| 804090 | 4/1951 | Fed. Rep. of Germany | ... 416/189 A |
| 2715729 | 12/1978 | Fed. Rep. of Germany | ... 416/189 A |
| 226504 | 2/1925 | United Kingdom | . |
| 1311776 | 3/1973 | United Kingdom | . |
| 1386335 | 3/1975 | United Kingdom | . |
| 1482933 | 8/1977 | United Kingdom | . |

*Primary Examiner*—Everette A. Powell, Jr.
*Attorney, Agent, or Firm*—Stevens, Davis, Miller & Mosher

[57] ABSTRACT

A rotor for operation without the influence of flow-guiding stationary housings or channels in a flow medium contained in a space of unlimited dimensions, particularly for a wind power plant or a helicopter or an autogiro, comprising one set of rotor blades and a shroud arranged in the region of the periphery of the rotor and formed as an axially symmetrical outer annular shroud rotating in unison with the rotor. The outer annular shroud in cross-section lying in an imaginary plane extending through the rotor axis has a profile the angle of which is greater than its critical (stalling) angle of attack with respect to a flow direction extending parallel to the rotor axis. The profile is adapted to generate a lift force under the effective flow conditions given at rotation of the rotor within the operational rotational speed range, and is oriented such that its suction side forms the inner side of the annular shroud.

18 Claims, 10 Drawing Figures

ROTOR FOR OPERATION IN A FLOW MEDIUM

It has already been proposed to provide a rotor with a corotating annular shroud along its periphery, such shroud having in cross-section an aerodynamic profile shaped and oriented such that flow through the rotor causes a circulation to develop about said profile effective to increase the amount of the flow medium flowing through the rotor. In this proposed rotor, the profile of the annular shroud is substantially in the shape of an airfoil profile oriented with respect to the rotor's axis of rotation at an angle that is smaller than the critical angle of attack. If a rotor of this type is driven by an engine, the resulting thrust will be increased over that of a rotor not provided with the annular shroud, or, if the rotor is employed for driving a generator, as in a wind generator plant, it is possible to increase the power extracted from a flow medium by means of a rotor of this type. In the proposed rotor, the annular shroud diverges in the flow direction downstream of the rotor in such a manner that the angle of attack under which the aerodynamic profile of the annular shroud is attacked by the flow medium, does neither exceed nor even reach the critical angle of attack. With this rotor it is possible to obtain a major power boost effect as compared to rotors not provided with an annular shroud only if the profile of the shroud has a relatively long chord line, which may lead to relatively expensive shroud designs.

It is an object of the invention to provide a rotor of the type defined in the introduction, combining simple construction and unexpensive production with the possibility of further increasing the flow-through amount or the efficiency rating, respectively, in comparison to hitherto proposed rotors with annular shroud, and being economical and reliable in operation.

In order to attain this object, the outer annular shroud in a cross-section lying in an imaginary plane extending through the rotor axis has a profile the angle of attack of which is greater than its critical (stalling) angle of attack with respect to a flow direction extending parallel to the rotor axis, said profile being adapted to generate a lift force under the effective flow conditions given at rotation of the rotor within the operational rotational speed range, and being oriented such that its suction side forms the inner side of the annular shroud.

The rotor according to the invention offers substantial advantages over prior art. The cross-sectional profile of the annular shroud of the rotor according to the invention in a plane extending through the rotor axis may be defined as a "geometric profile". This geometric profile is relevant for considering the flow conditions adjacent the annular rotor shroud as long as the rotor is stationary and the onflow arrives axially from in front. If, however, the rotor according to the invention is put into rotary motion, it performs a movement transversely of the direction of the onflow of the flow medium approaching the rotor, so that the relative motion of the flow and the rotor's annular shroud takes place not along the shroud's generating lines extending in parallel to the rotor axis, but rather at an angle to the generating lines of the annular shroud in dependence of the rotational speed and the onflow speed, the actual direction of motion extending in the direction of a speed vector resulting from a vector addition of the speed vector of the onflow upstream of the rotor and a vector of the absolute magnitude of the rotational speed vector and opposed thereto. The flow conditions resulting in this manner may also be considered as resulting from the flow direction not extending vertically to the rotor plane (with the annular shroud stationary), but at an angle to the generating lines of the annular shroud. This resulting effective angular flow may also be referred to as the "effective onflow" approaching the annular shroud at the upstream side of the rotor. As soon as the onflow enters the reach of the rotor blades, it will receive additional kinetic energy, if the rotor is an engine-driven turbine rotor, or, if the rotor is connected to a generator (as in a wind rotor), kinetic energy will be extracted from the flow. In both cases the flow direction will be changed, so that effective direction of the flow leaving the rotor blades at the downstream side of the rotor will be different from that of the entering flow. Besides the three named factors influencing the effective flow direction, namely, the axial speed vector of the entering flow, the circumferential speed of the rotor, and the kinetic energy conversion in the rotor blade plane, the effective flow direction may be influenced by additional factors, such as in the case of a helicoptor rotor provided with the annular shroud, which during forward flight is oriented at an angle to the direction of flight, resulting in an unsymmetry of the entering flow between the advancing and retreating sectors of the rotors. Additionally, the homogeneity of the effective flow prevailing adjacent the annular shroud along the periphery of the rotor will also be influenced by whether the rotor is designed such that in operation substantially identical flow conditions will be present about the entire rotor periphery. This will be the case for a rotor having a relatively great number of rotor blades in the rotor annulus, with the blades being disposed and spaced such that a so-called "grid-flow" is generated. The smaller the number of rotor blades, the more unhomogeneous will the flow conditions about the rotor periphery be, and the greater are the deviations of the effective flow direction about the rotor periphery from the effective flow direction adjacent the rotor blades. For considering the flow conditions around the annular shroud of the rotor according to the invention during rotation of the rotor, the relevant profile is in all cases not the geometric profile of the annular shroud in a plane extending through the rotor axis, but the profile of the annular shroud obtained by sectioning the shroud along a line extending in the effective flow direction along the annular shroud. Depending on the rotational speed of the rotor and on the flow conditions within the rotor resulting from the number, the configuration, and the orientation of the rotor blades, the effective flow direction will extend at a greater or smaller angle to the generating lines of the annular shroud. The "effective profile", which is relevant to the flow conditions, will therefore be longer than the length of the annular shroud as measured along a generating line, and the profile will accordingly be more "straightened" than the geometric profile. If the geometric profile is curved or angular, the curvature or the angle of the effective profile resulting from the operational flow conditions will be considerably less. In consideration of these facts, any inclination of the geometric profile with respect to the direction of the rotor axis (and the axial onflow direction), will not either be effective in its absolute geometric magnitude, but will also be considerably lessened in view of the effective flow direction. This implies that geometric profiles of the annular shroud, which with respect to their configuration and/or orientation to the axial flow direction result in an angle of attack which is equal to or even greater than the critical (stalling) angle of attack may act as quite effective profiles during operation of the rotor, in that with respect to the effective flow direction they are disposed and oriented such that the critical angle of attack is not reached with respect to the effective flow direction. With the rotor according to the invention stationary, an axial onflow may thus not result in a circulation about the profile of the annular shroud, since the flow will prematurely separate from the shroud, while operation of the rotor will result in an effective flow direction and an effective profile, with a circulation developing about the annular shroud, such circulation being inclined with respect to the rotor axis. Due to this circulation, the amount of the flow medium entering the rotor area surrounded by the annular shroud will be considerably greater per time unit than in the case of a rotor lacking the annular shroud. The annular shroud thus acts in the manner of a suction pump, introducing additional amounts of the flow medium into the rotor area from the surroundings of the rotor periphery at the upstream side thereof. In the rotor according to the invention, the geometric profile of the annular shroud may be very strongly curved or angled, and particularly in its downstream portion, it may extend radially outwardly at a substantial angle, for instance at right angles to the rotor axis with its downstream end. Even with this configuration, which would not permit the development of a circulation about the annular shroud with the rotar stationary and axial onflow direction, due to the geometric profile exceeding the critical angle of attack under these conditions, a circulation will still develop about the annular shroud on rotation of the rotor at operational rotational speed. The effective profile resulting in this case is "sub-critical" with regard to its configuration and angle of attack. The downstream end of the profile will then result in a flow direction at the downstream side of the rotor leaving the rotor at a great angle to the rotor axis, for instance at an angle of 90° or thereabove or below. In this manner it is possible to achieve a considerable increase of flow-through by comparison to hitherto proposed or known rotors. The apparently paradoxical possibility to direct the downstream flow leaving the rotor not in the form of a jet substantially following the rotor axis, but rather in a strongly divergent configuration with the outer limiting surfaces extending substantially transversely of the rotor axis, permits the flow leaving the rotor to be strongly expanded, which is of considerable advantage if the downstream flow is to be employed as a supporting jet, as for carrying and lifting aircraft, for instance a helicopter or an autogiro, since the expansion of the jet results in a considerable stabilization. The radially and conically expanding, rotating flow at the downstream side of the rotor according to the invention gradually expands with increasing axial distance from the rotor plane, resulting in an increase of the flow-through amount in the rotor plane as compared to hitherto proposed or known rotors. The rotor according to the invention is thus very efficient and of simple construction, and may be suitably employed as a rotor in a power generator as well as in a powerdriven machine such as a helicopter.

Advantageously the rotor according to the invention is designed such that the downstream end of the profile extends outwards at a large angle away from the rotor axis and substantially transversely thereof. This results in a particularly strong expansion of the downstream jet. This may be advantageous if the rotor is to be employed as a far rotor for blowing fresh air into a room from the ceiling thereof without a noticeable jet being directed into the room.

In an advantageous embodiment of the rotor according to the invention, the profile has a downstream portion disposed rearwardly of the plane defined by the trailing edges of the rotor blades and seen in the flow direction extending outwards away from the rotor axis. In this embodiment, the rear edge of the rotor shroud thus lies not in the plane of the trailing edges of the rotor blades, but in spaced relation downstream thereof, so that the flow leaving the rotor is guided over a certain distance by the downstream portion of the rotor shroud before exiting into the free environment. This embodiment permits a particularly effective guidance of the downstream flow to be achieved, as well as a particularly effective deflection of the downstream flow in a direction extending substantially transversely of the rotor axis.

In an advantageous structural configuration, the profile has a substantially rectilinear portion extending parallel to the rotor axis in the region of the outer ends of the rotor blades and connected rearwardly of the plane defined by the trailing edges of the rotor blades to a downstream portion extending away from the rotor axis under a large angle. In this embodiment, the rotor shroud is substantially in the shape of a circular cylinder in the area of the rotor blades, with a strongly divergent downstream portion being connected thereto rearwardly of the trailing edges of the rotor blades.

In this configuration, the rectilinear portion of the profile seen in the flow direction extends rearwardly beyond the plane defined by the trailing edges of the rotor blades. The rectilinear portion of the profile seen in the flow direction extends forwards beyond the plane defined by the leading edges of the rotor blades.

In an advantageous embodiment of the rotor according to the invention, the downstream portion of the profile has a rectilinear course. This configuration is particularly simple structurally and with respect to production techniques. The downstream portion of the profile extends perpendicular to the rotor axis.

The downstream portion of the profile may also, however, extend at a large acute angle with respect to the rotor axis.

In a flow-dynamically advantageous configuration of a rotor according to the invention having a rectilinear portion adjacent the rotor blades, the rectilinear portion of the profile is connected to the downstream portion thereof through an arcuate transition portion. In this manner it is possible to avoid abrupt flow deflections and the existence of edges causing drag and turbulence.

The rotor according to the invention may also be designed such that the transition portion of the profile between the rectilinear portion and the downstream portion thereof is formed as a sharp corner. This configuration is particularly simple structurally and still effective.

The rotor according to the invention is advantageously designed such that the profile has an upstream portion disposed forwardly of the plane defined by the leading edges of the rotor blades, the distance of said upstream portion from the rotor axis gradually decreasing seen in the flow direction. The provision of this upstream portion forward of the rotor blade anulus contributes in an advantageous manner to the confluence and guidance of the flow medium already upstream of the rotor blades.

In this embodiment of the rotor according to the invention it is advantageous if the upstream portion of the profile has a rectilinear course and extends at an acute angle to the rotor axis. This results in a simple structural configuration of the rotor shroud in the upstream portion thereof.

In a rotor according to the invention, in which the profile of the annular shroud comprises a rectilinear portion, a particularly advantageous flow-dynamic configuration is achieved in that a transition portion of the profile between the upstream portion and the rectilinear portion thereof is of arcuate shape. In an alternative configuration, the transition portion of the profile between the upstream portion and the rectilinear portion thereof is formed as a sharp corner. This results again in a particularly simple construction.

In a particularly advantageous embodiment of the rotor according to the invention, the profile is formed as an aerodynamically shaped profile having a leading nose and a trailing edge. In this manner the drag of the annular shroud is kept as low as possible, and a particularly extensive flow condition and throughflow increase is achieved.

In a particularly advantageous embodiment, the rotor according to the invention comprises an additional inner annular shroud radially inwardly spaced from the outer annular shroud, said inner annular shroud being fully immersed in the flow. This inner annular shroud permits the flow to be guided not only adjacent the outer ends of the rotor blades, but also adjacent the inner ends thereof.

In a particularly advantageous embodiment, the inner annular shroud in a cross-section lying in an imaginary plane extending through the rotor axis has a profile shaped such that it does at least not counteract the circulation occuring around the outer annular shroud under an effective onflow given during rotation of the rotor within its operational rotational speed range. In this embodiment, the inner annular shroud acts either as a guide surface for flow stabilization, or, if a circulation is able to develop around the inner shroud, as an additional means for increasing the flow medium flowing through the rotor.

In an advantageous configuration, the inner annular shroud has a symmetrical profile with the symmetry axis extending parallel to the rotor axis.

In an alternative advantageous embodiment, the profile of the inner annular shroud is shaped such as to be adapted to generate a lift force under the effective onflow and is oriented such that its suction side forms the radially outer side of the inner annular shroud. With this configuration, the inner annular shroud is also effective to increase the flow-through amount.

A rotor according to the invention provided with an inner annular shroud disposed at a radial distance inwardly of an outer shroud generates a divergent downstream flow having a circumferential flow component and not only a sharply defined outer boundary, but also a sharply defined inner boundary, with the inner boundary diverging at a smaller angle with respect to the rotor axis, so that the outer and inner boundaries diverge relative to one another. Accordingly, the annular area swept by the downstream flow increases in size transversely of the rotor axis in proportion to the increasing distance from the rotor main plane. In contrast to a rotor not provided with an annular shroud, which is known to cause a contraction of the jet downstream of the rotor, the rotor according to the invention causes a jet expansion to occur at a magnitude hitherto not achieved by any of the known shrouded rotors. At the same time, there occurs a corresponding decrease of the flow velocity downstream of the rotor, resulting in a correspondingly increased propulsion efficiency.

Due to the downstream flow being expanded by the shrouds, the rotor according to the invention, particularly the rotor with an inner annular shroud in addition to the outer shroud, is also particularly well suited for employ in a wind power plant, the wind rotor of which requires a large downstream space in any case.

The obtuse conical shape of the circumferentially circulating downstream flow of the rotor according to the invention results in an inwardly directed centripetal force. Accordingly, the pressure is higher towards the center than peripherally, and the downstream flow velocity is smaller towards the center than peripherally. The resulting effect is comparable to the ground effect noticed in the case of helicopters, with the noteworthy difference, however, that the effect achieved by the rotor according to the invention is obtainable independent of ground proximity in free space.

In an advantageous embodiment of the invention, the rotor is provided with a number of rotor blades sufficient to warrant the generation of a "grid flow". Due to this configuration, the flow conditions about the rotor adjacent the outer annular shroud and, if present, also adjacent the inner annular shroud will be substantially uniform, thus ensuring a homogeneous flow guidance about the entire periphery of the rotor and guidance of the downstream flow.

Figure 2:
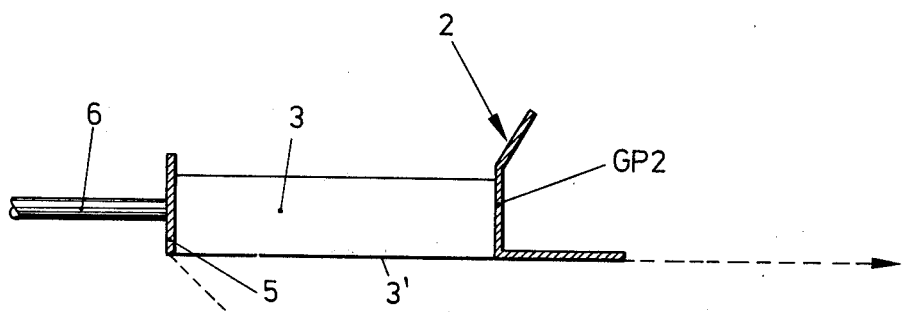
Figure 3:
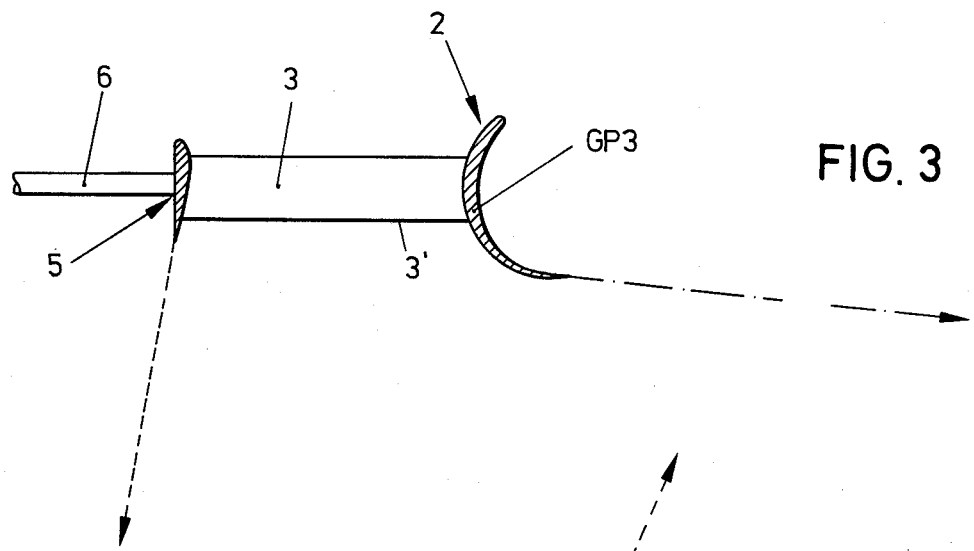
Figure 4:
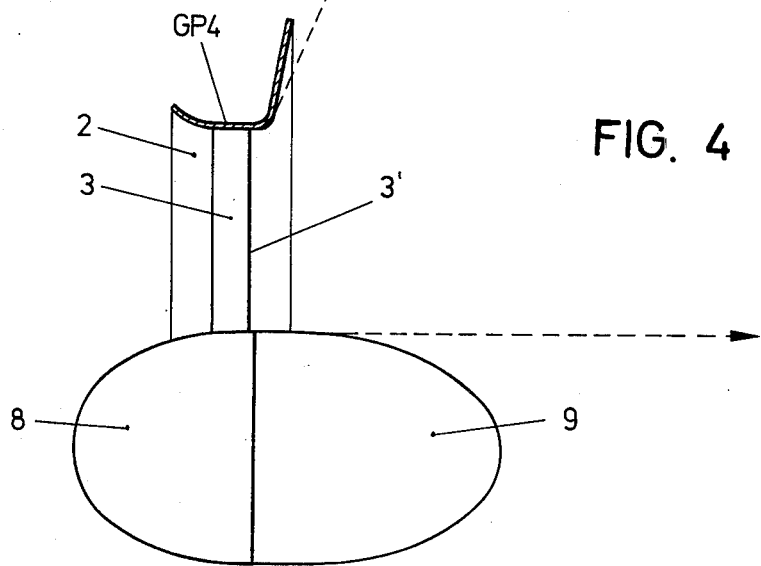
Figure 5:
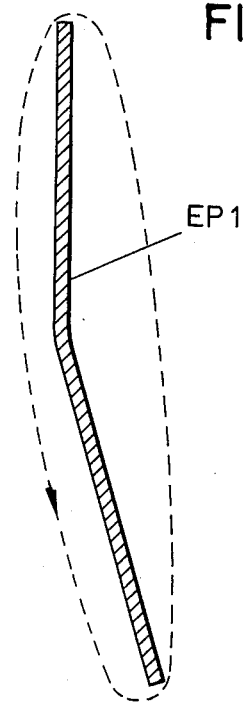
Figure 6:
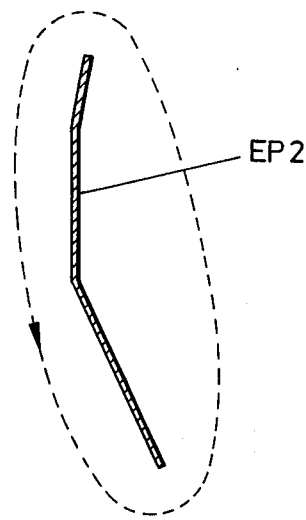
Figure 7:
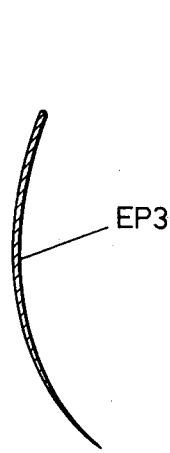
Figure 8:
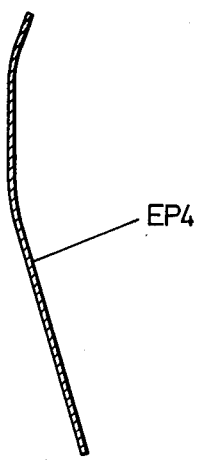
Figure 9:
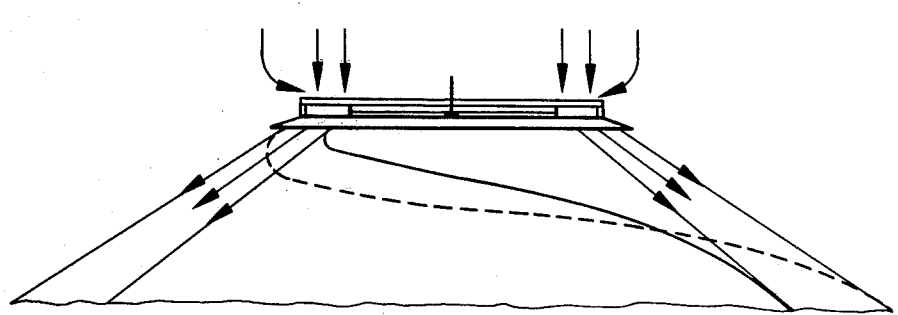
Figure 10:
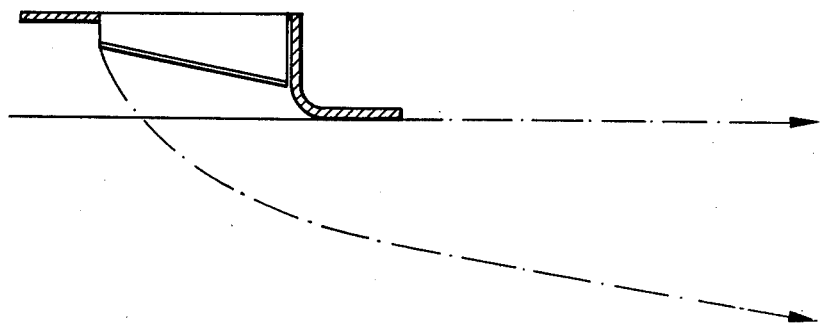

Embodiments of the invention shall now be described with reference to the accompanying drawings, wherein FIG. 1 shows a partially sectioned perspective view of a portion of a rotor in a first embodiment of the invention, FIG. 2 shows a partially sectioned view of a rotor portion in a second embodiment of the invention, FIG. 3 shows a partially sectioned view of a rotor portion in a third embodiment of the invention, FIG. 4 shows a partially sectioned view of a rotor portion in a fourth embodiment of the invention, FIG. 5 shows a diagrammatic view of the effective profile of the outer annular shroud of the rotor according to FIG. 1 resulting under the effective flow, FIG. 6 shows a diagrammatic view of the effective profile of the outer annular shroud of the rotor shown in FIG. 2 under the influence of the effective flow, FIG. 7 shows a diagrammatic view of the effective profile of the outer annular shroud of the rotor shown in FIG. 3 under the influence of the effective flow, FIG. 8 shows a diagrammatic view of the effective profile of the outer annular shroud of the rotor shown in FIG. 4 under the influence of the effective flow, FIG. 9 shows a diagrammatic side view of a rotor in a fifth embodiment of the invention, and FIG. 10 shows a diagrammatic side view of a rotor in a sixth embodiment of the invention.

FIG. 1 shows a partial perspective view of a first embodiment of the rotor. While the rotor in FIG. 1 is shown with a vertical axis 1, in which position it may be employed for instance as a fan rotor driven by an electric motor (not shown), the same rotor may also be employed with its axis horizontal. The rotor has an outer annular shroud 2 affixed to the outer ends of the rotor blades 3 as by means of bolts or rivets. Shroud 2 is of axially symmetric configuration and rotates in unison with the rotor. In an imaginary plane extending through the rotor axis 1, annular shroud 2 has a cross-sectional profile GP1 referred to as a "geometric profile" hereinafter. In the embodiment shown in FIG. 1, profile GP1 is composed of two rectilinear portions 4' and 4" extending at right angles to one another, with portion 4' being parallel to axis 1 and portion 4" projecting outwardly at right angles to axis 1. The general flow direction of a medium flowing towards the rotor in FIG. 1 is designated by arrow Z and extends substantially parallel to axis 1. In the flow direction, rectilinear portion 4' of profile GP1 extends rearwardly beyond a plane defined by the trailing edges of rotor blades 3, and forwardly beyond a plane defined by the leading edges of blades 3. Rectilinear portion 4" forms the downstream portion of profile GP1. The transition between the rectilinear portion 4' and downstream portion 4" of profile GP1 is formed as a sharp corner.

The rotor shown in FIG. 1 has a total number of twenty-four blades distributed about its periphery. The rotor blades are located relatively close to one another and disposed such that the flow developing therebetween may be considered a "grid flow" in the sense of fluid dynamics. At a radial distance inwardly of outer annular shroud 2, the rotor shown in FIG. 1 additionally has an inner annular shroud 5 attached to the inner ends of rotor blades 3. Inwards of inner shroud 5 there are provided radially extending struts 6, the inner ends of which are attached to a hub 7, itself non-relative rotatably affixed to axis 1, so that the entire rotor rotates in unison with axis 1. In the rotor shown in FIG. 1, inner shroud 5 is swept by the flow medium at its radially outer side as well as at its radially inner side, since the annular space between inner shroud 5 and hub 7 is not completely filled with material and is therefore fluid-pervious. In an imaginary plane extending along axis 1, inner shroud 5 of the rotor shown in FIG. 1 has a rectilinear rectangular cross-sectional profile extending parallel to the rotor axis and thus to the general inflow direction.

Shown in FIG. 1 in phantom lines are a number of flow lines at the radially inner side of outer annular shroud 2, said lines representing "stream threads of the effective flow paths" extending along the annular shroud as developed on rotation of the rotor in the direction designated by arrow U. Under these conditions, the relative movement of the inflowing medium is composed of the inflow speed and a speed vector inversely equal to the rotational speed. The effective motion of the flow along the annular shroud 2 thus occurs not parallel to rotor axis 1 but at an angle thereto. As soon as the flow reaches the rotor blades 3, it receives further kinetic energy therefrom, if the rotor operates as a turbine rotor, i.e. as a motor-driven rotor; if the rotor were a wind wheel (in which case, however, the rotor blades would have to be oriented differently or disposed in an opposite sense with respect to their profiles), kinetic energy would be extracted from the flow in the vicinity of the rotor blades. In both cases there occurs a certain deflection of the flow movement adjacent the rotor blades, so that at the downstream side of the rotor, the flow leaves the plane defined by the trailing edges 3' of the rotor blades in a changed direction of movement. This has been taken into account by a corresponding design of the stream threads on the radially inner wall of annular shroud 2. With its inherent kinetic energy, the flow then follows the transition between the two rectilinear portions 4' and 4" of profile GP1, and then flows (always seen relative to the rotor and shroud 2) along spiral-shaped paths in a plane extending substantially transversely of the rotor axis 1. The flow proceeding along the radially inwardly and downwardly, respectively, facing surfaces of profile GP1 forms the boundary surface with respect to the environment after leaving the rotor. This outer boundary surface of the downstream flow extends substantially transversely of the rotor axis 1. Although, with the rotor stationary, the rectilinear portion 4" of profile GP1 constitutes a baffle surface with respect to an inflow extending along the rotor axis, so that the profile will produce a strong drag and the flow could not by any means be deflected therearound at right angles, but would rather separate therefrom with vortex formation at the corner-shaped transition between rectilinear portions 4' and 4", the substantially right-angled deflection of the flow on its path from its entry into the rotor to its exit therefrom about the substantially right-angular profile GP1 of shroud 2 is made possible, and in fact brought about by the fact that during the rotation of the rotor in operation the inflow does not impinge on the annular shroud in the axial direction, but in the direction of the inclined flow lines shown in phantom lines in FIG. 1. Due to this inclination, the flow does not encounter a rectangular profile, but a profile "straightened" in correspondence to the inclination of the flow direction, said straightened profile constituting an "effective" profile EP1 diagrammatically shown in FIG. 5. From FIG. 5, it is clearly evident that this effective profile EP1, which has to be considered as being frontally attacked by the inflow under the flow conditions developed by rotation of the rotor, may definitely be considered as a flow profile disposed in its entirety at an angle with respect to the inflow direction smaller than the critical (stalling) angle of a straightened profile of this kind, so that separation of the current will not even occur at the corner contained in the profile EP1. In operation of the rotor, a circulation as diagrammatically shown in FIG. 5 may therefore develop about the profile EP1, so that the effective profile EP1 acts in the manner of an aerodynamic wing profile with its suction side facing radially inwardly. This circulation acts to guide the effective flow through the rotor along profile GP1 (or rather, along effective profile EP1), without separation or detachment of the current occurring. The flow then leaves the rotor along the downstream portion 4" of the profile GP1, with the individual stream threads extending in a plane extending substantially transversely of the rotor axis 1, not radially thereto, but rather at an angle with a circumferential speed component. The result is in any case a deflection of the flow to a direction extending substantially perpendicular to the rotor axis, and thus an expansion of the downstream flow behind the rotor totally unknown in the case of known rotors.

The inner annular shroud 5 does not interfere with the effect of the outer shroud 2, since it extends parallel to rotor axis 1, so that no circulation is developed around inner shroud 5 which might counteract the circulation around outer annular shroud 2. It is found that with the developing flow conditions, the boundary surface of the downstream flow extends slightly outwards from the outflow end of the inner shroud, the exact direction of the inner boundary surface of the downstream flow as well as the exact direction of the outer boundary surface of the downstream flow depending on structural details of the rotor, such as the length of the outflow spaces rearwards of the trailing edges of the rotor blades, the length of the inflow spaces forwards of the leading edges of the rotor blades, the shape of the rotor blades themselves, and the rotational speed of the rotor. Shown in FIG. 1 is the developing basic configuration of the downstream flow. With the rotor shown in FIG. 1 it is thus possible to generate an outflow jet which in contrast to the substantially axially directed inflow expands in a conical or up to nearly disc-shaped configuration outwardly and away from the rotor axis. Due to the circulation developing about the effective profile EP1, the rotor intake is not restricted to the medium directly in front of the annular rotor face in the shape of a column, but emcompasses a considerably greater amount of the medium from the area in front of and radially outward of the rotor. The resulting flow conditions are diagrammatically shown in FIGS. 9 and 10 in connection with other embodiments of the rotor, the basic flow pattern through the rotor as shown in these figures being also applicable to a rotor as shown in FIG. 1.

FIG. 2 shows a partial view of a second embodiment of the rotor in a sectional view along an imaginary plane extending through the rotor axis. As far as the basic construction of the rotor shown in FIG. 2 corresponds to that of the rotor shown in FIG. 1, the same reference numerals are employed in FIG. 2. As far as the construction is identical, the description is not repeated. In the rotor shown in FIG. 2, the outer annular shroud has a geometric profile GP2 provided with an inflow portion which is different from that of the profile GP1 shown in FIG. 1. The inflow portion of profile GP2 is rectilinear but extends at an acute angle to the rotor axis, with the transition between the inflow portion and the rectilinear portion of profile GP2 being formed as a sharp corner. The rectilinear portion of profile GP2 does not substantially extend beyond the trailing edges 3' of the rotor blades, instead of which it is abutted at a corner adjacent the leading edges by the rectilinear downstream portion projecting radially outwards. The explanations regarding the relative speeds of the rotor and the inflowing medium and the effective flow resulting therefrom as set forth in connection with the rotor shown in FIG. 1 also apply to the rotor embodiment of FIG. 2 in an analogous sense. During rotation of the rotor, the effective flow encounters an effective profile EP2 resulting from "straightening" of geometric profile GP2 as diagrammatically shown in FIG. 6. From FIG. 6 it is again evident that the effective profile EP2 definitely acts as an aerodynamic profile under frontal attack by the effective onflow, with no separation of the current taking place even at the angular transition portions. The effective profile EP2 virtually constitutes a wing profile inclined with respect to the onflow at a relatively small angle safety below the critical (stalling) angle of a profile of this type, so that a circulation develops about the profile. This brings about, in the embodiment shown in FIG. 2, basically the same effects as in the rotor shown in FIG. 1. This means that at the downstream side of the rotor the outflow is directed along the outer surface substantially transversely of the rotor axis in outward direction, while the inner boundary of the downstream flow still diverges outwardly in conical shape. There is thus formed a downstream flow the cross-sectional area of which increases in size in the flow direction.

FIG. 3 shows a third embodiment of the rotor according to the invention. As far as its construction corresponds to that of the rotors shown in FIGS. 1 and 2, the same reference numerals are again employed. The description of identical components need not be repeated. FIG. 3 again shows a sectional view in an imaginary plane extending through the rotor aixs. In this embodiment, the outer annular shroud has a geometric profile GP3 of arcuate configuration with a strong curvature. Profile GP3 has an inflow portion projecting forwards beyond the leading edges of the rotor blades 3, and an outflow portion extending rearwards beyond the trailing edges of rotor blades 3. At its end, the outflow portion extends outwards substantially transversely of the rotor axis, ending in a sharp edge. The upstream end of profile GP3 is rounded.

In the rotor embodiment shown in FIG. 3, the same basic flow conditions discussed in connection with the rotors shown in FIGS. 1 and 2 are developed on rotation of the rotor. The effective flow causes the geometric profile GP3 to be "straightened" along the effective flow path, resulting in an effective profile EP3 diagrammatically shown in FIG. 7 and having, as clearly evident, the shape of a wing profile frontally attacked by the effective flow at a small angle of attack which is less than the critical (stalling) angle. In the case of this effective profile, the flow will thus also proceed without separation along the full length of the profile to the downstream edge thereof, and from there, in correspondence to the configuration of the downstream portion of the profile, continue in an outward direction substantially transversely of the rotor axis, as shown in phantom in FIG. 3.

In the rotor shown in FIG. 3 there is provided an inner annular shroud 5 having, in contrast to the annular shrouds of the rotors shown in FIGS. 1 and 2, a geometric profile in the shape of a wing profile with the suction side thereof forming the radially outer side. The chord of this profile extends substantially parallel to the rotor axis, so that, even though the profile is longitudinally "straightened" by the angular effective flow, a circulation will be developed under onflow conditions, which circulation will not, however, counteract the circulation around the effective profile EP3, but will rather increase the effect thereof by introducing into the inner area of the rotor cross-section flow medium from areas lying outside of the cylinder extending forwardly of the annular rotor face. Due to the circulation developing around the inner annular shroud, the downstream flow at the inner region of the rotor does not follow a conically divergent boundary surface, but extends along an inner boundary surface which may even be slightly inclined towards the rotor axis. The exact configuration and the exact direction of the boundary surfaces of the downstream flow again depends on the individual dimensions of the several parts of the rotor and on the relations therebetween.

FIG. 4 shows in partial axial section a diagrammatic view of a rotor employed as a wind wheel in a wind power plant in a fourth embodiment of the invention. In this embodiment, the inner ends of the rotor blades 3 are not attached to an inner shroud, but to a centrally located, streamlined hub 8. The rotor and the hub are rotatably mounted in a streamlined housing 9 aligned with hub 8. Housing 9 contains a (not shown) generator driven by the rotor. Attached to the outer ends of rotor blades 3 is an outer annular shroud 2 having a geometric profile GP4 in a cross-sectional plane extending through the rotor axis. Adjacent the outer ends of the rotor blades, profile GP4 has a rectilinear portion extending substantially parallel to the rotor axis. Upstream of the leading edges of rotor blades 3, profile GP4 has an inflow portion comprising a rectilinear outer portion connected to the portion of the profile attached to the outer ends of the rotor blades by an arcuate transition portion. Profile GP4 further comprises a rectilinear downstream portion extending outwards at a large acute angle from the rotor axis and hving its inner portion connected to the rectilinear portion by an arcuate transition portion. The same basic flow conditions already discussed with reference to the rotors shown in FIGS. 1 to 3 will also develop in this rotor embodiment. With respect to the developing effective flow, geometric profile GP4 is "straightened" to an effective profile EP4 shown in FIG. 8, said profile being substantially frontally attacked by the effective flow and being inclined relative thereto at an angle of attack which is smaller than the critical (stalling) angle, so that also in this case the effective flow may proceed without separation along the entire length of effective profile EP4 to the downstream edge thereof. In this embodiment of the rotor the downstream flow has a conically divergent outer boundary. Adjacent the inner ends of rotor blades 3 of this rotor, the flow extends along the surfaces of hub 8 and housing 9, so that the inner boundary of the downstream flow extends substantially parallel to the rotor axis. The overall result is a downstream flow conically expanding away from the rotor under a very large opening angle. This is of great advantage in the case of a wind power plant, in which the flow should surrender as much of its energy as possible to the wind wheel. In the case of the rotor shown in FIG. 4, improvement of the flow conditions and an increase of the flow-through amount could also be achieved by providing an inner annular shroud radially spaced from the outer shroud, the space between the inner shroud and the hub 8 in this case being bridged by thin struts in place of rotor blade portions, so that the flow may pass along both sides of the inner shroud. In this case the inner annular shroud may again be employed for increasing the amount of the flow medium passing through the rotor and thus for improving the performance.

FIG. 9 shows a side view of a further embodiment of the rotor. In this embodiment, the downstream portion of the geometric profile of the outer annular shroud is of rectilinear configuration conically diverging under a large angle with the rotor axis. Also provided is an inner annular shroud formed substantially in the shape of a circular cylinder and disposed coaxially with the rotor axis. In this rotor embodiment, the downstream flow is in the shape of a rearwardly strongly divergent conus shell. Due to the circulation around the outer annular shroud developed in the effective flow, a flow condition is obtained by means of which a greater amount of the flow medium is guided through the rotor than the amount of the flow medium contained in an imaginary cylinder in front of the rotor surface, as shown by the curved arrows at the inflow side of the rotor in FIG. 9. The rotor embodiment shown in FIG. 9 may be advantageously employed as a rotor for a helicopter. Instead of grandually contracting in the direction of the rotor axis, the downstream flow produced by this rotor strongly diverges in the shape of a conus shell after leaving the rotor. This results in the rotor being supported on the conus-shaped downstream flow over a very wide base, and thus in a strong stabilizing effect. Moreover, this rotor has a very high flow-through performance and thus a high lift and propulsion efficiency.

A further embodiment of the rotor is shown in FIG. 10. This embodiment shows in diagrammatic form, partially in axial section, a rotor employed as a fan rotor for room ventilation or the like. For making this rotor, a sheet metal disc is initially deep-drawn to produce an outer annular shroud of substantially rectangular cross-section. The rotor blades are formed by stamping lugs out of the deep-drawn metal sheet member and by bending the thus formed lugs. In this manner one obtains a rotor formed from a single piece of sheet metal, with the outer ends of the rotor blades being connected to the outer annular shroud only through narrow webs. A small clearance exists between a portion of the outer edges of the rotor blades and the inner surface of the outer annular shroud. Also in this embodiment of the rotor, rotation of the rotor causes an effective flow to develop, whereby a circulation about the outer annular shroud is induced in correspondence to the direction of the effective flow. Also in this case, the effective profile is relevant for the flow development. The outer boundary of the air flow passing through the rotor extends substantially radially outwardly from the downstream portions of the outer annular shroud. The rotor shown in FIG. 10 lacks an annular shroud at the inner ends of the rotor blades. The inner boundary of the air flow passing through the rotor also extends outwardly away from the rotor axis under a large angle.

The flow directions at the inner and outer boundaries of the flow through the rotor are shown by phantom lines in FIG. 10.

The invention is not restricted to the above-described embodiments. The geometric profile of the outer annular shroud may for instance also be formed such that its upstream portion does not extend forwardly beyond the leading edges of the rotor blades.

Any characteristic features set forth in the description and/or shown in the drawings, including any structural details, may be essential to the invention individually or in any combination.

I claim:

1. A rotor for a wind power plant for operation without the influence of flow-guiding stationary housings or channels in a flow medium contained in a space of unlimited dimensions as compared to the rotor dimensions, comprising one set of rotor blades and a shroud arranged in the region of the periphery of the rotor having an axis and formed as an axially symmetrical outer annular shroud rotating in unison with the rotor, said outer annular shroud in a cross-section lying in an imaginary plane extending through the rotor axis having a profile the angle of attack of which is greater than its critical angle of attack with respect to a flow direction extending parallel to the rotor axis, said profile being adapted to generate a lift force under the effective flow conditions given at rotation of the rotor within the operational rotational speed range, and being oriented such that its suction side forms the inner side of the annular shroud, said profile having a downstream portion extending outwardly at a large angle away from the rotor axis and substantially transversely thereof.

2. The rotor according to claim 1 wherein said downstream portion is disposed rearwardly of the plane defined by the trailing edges of the rotor blades and as seen in the flow direction extens outwards away from the rotor axis.

3. The rotor according to claim 1 or 2, wherein said profile has a substantially rectilinear portion extending parallel to the rotor axis in the region of the outer ends of the rotor blades and a downstream portion connected rearwardly of the plane defined by the trailing edges of the rotor blades which extends away from the rotor axis under a large angle.

4. The rotor according to claim 3, wherein said rectilinear portion of the profile seen in the flow direction extends rearwardly beyond the plane defined by the trailing edges of the rotor blades.

5. The rotor according to claim 3, wherein said rectilinear portion of the profile seen in the flow direction extends forwards beyond the plane defined by the leading edges of the rotor blades.

6. The rotor according to claim 2, wherein said downstream portion of the profile has a rectilinear course.

7. The rotor according to claim 6, wherein said downstream portion of the profile extends perpendicular to the rotor axis.

8. The rotor according to claim 6, wherein said downstream portion of the profile extends at a large acute angle with respect to the rotor axis.

9. The rotor according to claim 3, wherein said rectilinear portion of the profile is connected to the downstream portion thereof through an arcuate transition portion.

10. The rotor according to claim 3, wherein said profile has a transition portion between the rectilinear portion and the downstream portion thereof which is formed as a sharp corner.

11. The rotor according to claim 1 or 2, wherein said profile has an upstream portion disposed forwardly of the plane defined by the leading edges of the rotor blades, the distance of said upstream portion from the rotor axis gradually decreasing seen in the flow direction.

12. The rotor according to claim 11, wherein said upstream portion of the profile has a rectilinear course and extends at an acute angle to the rotor axis.

13. The rotor according to claim 3, wherein said profile has an upstream portion and a transition portion between the upstream portion and the rectilinear portion thereof, said transition portion being of arcuate shape.

14. The rotor according to claim 3, wherein said profile has an upstream portion and a transition portion between the upstream portion and the rectilinear portion thereof, said transition portion being formed as a sharp corner.

15. The rotor according to claim 1 or 2, wherein said profile is formed as an aerodynamically shaped profile having a leading nose and a trailing edge.

16. The rotor according to claim 1 or 2, wherein said rotor comprises an additional inner annular shroud radially inwardly spaced from the outer annular shroud, said inner annular shroud being fully immersed in the flow.

17. The rotor according to claim 16, wherein said inner annular shroud has a symmetrical profile with the symmetry axis extending parallel to the rotor axis.

18. The rotor according to claim 17, wherein said profile of the inner annular shroud is shaped such as to be adapted to generate a lift force under the effective onflow and is oriented such that its suction side forms the radially outer side of the inner annular shroud.

* * * * *

UNITED STATES PATENT AND TRADEMARK OFFICE
CERTIFICATE OF CORRECTION

PATENT NO. : 4,289,450

DATED : September 15, 1981

INVENTOR(S) : Alberto KLING

It is certified that error appears in the above–identified patent and that said Letters Patent are hereby corrected as shown below:

On the title page,

Item [56] The References Cited should be changed from:

"U. S. PATENT DOCUMENTS 3,222,533   12/1965  MacKay ................... 416/189 A X

FOREIGN PATENT DOCUMENTS

| 804090  | 4/1951  | Fed. Rep. of Germany | 416/189 A |
| 2715729 | 12/1978 | Fed. Rep. of Germany | 416/189 A |
| 226504  | 2/1925  | United Kingdom | . |
| 1311776 | 3/1973  | United Kingdom | . |
| 1386335 | 3/1975  | United Kingdom | . |
| 1482933 | 8/1977  | United Kingdom" | . |

To:

-- U. S. PATENT DOCUMENTS

| 1,467,227 | 9/1923  | Capell ........... | 416/189 |
| 3,222,533 | 12/1965 | MacKay ........... | 416/189 A X |
| 3,447,741 | 6/1969  | Havette, et al ... | 416/189 X |
| 3,504,990 | 4/1970  | Sugden ........... | 416/189 X |
| 3,695,780 | 10/1972 | Velkoff .......... | 416/189 |
| 4,147,472 | 4/1979  | Kling ............ | 416/193 R |

UNITED STATES PATENT AND TRADEMARK OFFICE
CERTIFICATE OF CORRECTION

PATENT NO. : 4,289,450

DATED : September 15, 1981

INVENTOR(S) : Alberto KLING

It is certified that error appears in the above-identified patent and that said Letters Patent are hereby corrected as shown below:

FOREIGN PATENT DOCUMENTS

| | | |
|---|---|---|
| 804090 | 4/1951 Fed. Rep. of Germany | ... 416/189 A |
| 2715729 | 12/1978 Fed. Rep. of Germany | ... 416/189 A |
| 20751 | 9/1912 United Kingdom | ......... 416/192 |
| 213022 | 3/1924 United Kingdom | ......... 416/189 |
| 226504 | 2/1925 United Kingdom | . |
| 1311776 | 3/1973 United Kingdom | . |
| 1386335 | 3/1975 United Kingdom | . |
| 1482933 | 8/1977 United Kingdom | . |
| 408512 | 1/1945 Italian | ............... 416/193 R -- |

Signed and Sealed this

*Eleventh* Day of *May 1982*

[SEAL]

*Attest:*

GERALD J. MOSSINGHOFF

*Attesting Officer*    *Commissioner of Patents and Trademarks*